United States Patent
Johnston

(10) Patent No.: US 7,047,907 B1
(45) Date of Patent: May 23, 2006

(54) LITTER SCOOP HAVING DISPOSABLE COVERING

(76) Inventor: Bernard J. Johnston, 57 Titus Ct., Richboro, PA (US) 18954

( * ) Notice: Subject to any disclaimer, the term of this patent is extended or adjusted under 35 U.S.C. 154(b) by 0 days.

(21) Appl. No.: 10/968,412

(22) Filed: Oct. 18, 2004

(51) Int. Cl.
*A01K 1/01* (2006.01)
*A01K 29/00* (2006.01)

(52) U.S. Cl. .................. 119/867; 294/1.3; 15/257.9

(58) Field of Classification Search ............... 119/867, 119/167, 168, 170; 294/1.3, 1.4, 1.5; 56/400.01, 56/400.08, 400.11; D30/162; 37/316, 405; 15/257.9
See application file for complete search history.

(56) References Cited

U.S. PATENT DOCUMENTS

| | | | | | |
|---|---|---|---|---|---|
| 1,554,525 | A | * | 9/1925 | Ricci | 209/419 |
| 1,648,906 | A | * | 11/1927 | Lubrano | 99/323 |
| 2,020,293 | A | * | 11/1935 | Adelstein | 15/105 |
| 2,475,619 | A | * | 7/1949 | Johnson | 15/257.7 |
| 2,484,461 | A | * | 10/1949 | Perry, Jr. | 294/106 |
| 2,545,226 | A | * | 3/1951 | Claude | 294/55 |
| 2,708,401 | A | * | 5/1955 | Leclerc et al. | 100/234 |
| 2,887,948 | A | * | 5/1959 | Kramer et al. | 100/213 |
| 3,342,518 | A | * | 9/1967 | Gorton, Jr. | 294/99.2 |
| 3,739,418 | A | | 6/1973 | Yonaites et al. | 15/104.8 |
| 3,854,578 | A | | 12/1974 | Sharpe | 206/233 |
| 3,879,079 | A | * | 4/1975 | Nicholas | 294/1.4 |
| 4,305,376 | A | * | 12/1981 | Neugent | 126/242 |
| 4,483,560 | A | * | 11/1984 | Lordi | 294/1.3 |
| 4,904,009 | A | * | 2/1990 | Kozlinski | 294/7 |
| 5,033,780 | A | * | 7/1991 | Wootten | 294/1.3 |
| 5,158,042 | A | * | 10/1992 | Hammerslag et al. | 119/167 |
| 5,186,506 | A | * | 2/1993 | Gale | 294/1.3 |
| 5,207,772 | A | * | 5/1993 | Lauretta et al. | 119/167 |
| 5,335,591 | A | * | 8/1994 | Pozar | 100/116 |
| 5,417,044 | A | * | 5/1995 | Russo | 56/400.11 |
| 5,536,055 | A | * | 7/1996 | Kohn | 294/1.3 |
| 5,551,741 | A | * | 9/1996 | LaBoccetta | 294/7 |
| 5,580,111 | A | * | 12/1996 | Bohn | 294/1.3 |
| 5,738,399 | A | * | 4/1998 | Mitchell | 294/1.3 |
| 5,741,036 | A | * | 4/1998 | Ring | 294/1.3 |
| D433,289 | S | * | 11/2000 | Durbin et al. | D7/666 |
| 6,233,780 | B1 | * | 5/2001 | Mead | 15/257.3 |
| 6,354,243 | B1 | * | 3/2002 | Lewis et al. | 119/165 |
| 6,578,807 | B1 | * | 6/2003 | Lipscomb et al. | 248/314 |
| 6,595,159 | B1 | * | 7/2003 | Montalbano | 119/167 |
| 6,976,661 | B1 | * | 12/2005 | Lipscomb et al. | 248/314 |
| 2004/0227364 | A1 | * | 11/2004 | Pain et al. | 294/1.3 |

* cited by examiner

*Primary Examiner*—Yvonne R. Abbott
(74) *Attorney, Agent, or Firm*—Lamorte & Associates

(57) ABSTRACT

A scoop assembly having a scoop structure with a head section and a handle that extends from the head section. The head section of the scoop structure defines a plurality of openings. A removable liner is provided that lines the head section of the scoop structure. The liner defines a plurality of slots that orient atop the openings in the head section of the scoop structure. As a result, when the scoop structure is used to scoop solid waste, only the liner comes into physical contact with the solid waste and becomes soiled. The soiled liner can then be disposed with the solid waste and a new liner attached to the scoop structure. The scoop structure can therefore be kept clean without the need for repeated washings.

13 Claims, 3 Drawing Sheets

LITTER SCOOP HAVING DISPOSABLE COVERING

BACKGROUND OF THE INVENTION

1. Field of the Invention

In general, the present invention relates to litter scoops of the type used to clean cat litter boxes. More particularly, the present invention relates to scoops having detachable elements that are disposable.

2. Prior Art Description

Many pet owners, especially cat owners, provide litter boxes for their pets. However, after the litter boxes have been used, the litter must be either cleaned or changed. Traditionally, litter is cleaned using a litter scoop. A litter scoop is a small shovel having a slotted face. The slots formed in the face of the shovel are larger than the grain size of the litter. Consequently, when the scoop is run through the litter, the litter passes through the face of the scoop and is not lifted out of the litter box by the scoop. However, any solid pet waste that is present in the litter is typically larger than the slots in the scoop. As a result, the solid waste can be removed from the litter by the passing scoop.

Since the scoop contacts the solid animal waste contained within the litter, the scoop often becomes soiled. The scoop itself, therefore, becomes unsanitary and care must be taken in the cleaning and the storing of the scoop.

Recognizing the unsanitary conditions that accompany a traditional litter box scoop, many disposable scoops have been invented. Disposable litter scoops are exemplified by U.S. Pat. No. 3,739,418 to Yonaites, entitled Litter Scoop. Disposable scoops are typically made of thin bags of paper and plastic that are used to grab solid waste. Thus, disposable scoops are typically not slotted and therefore lift both litter and waste material out of the litter box together.

U.S. Pat. No. 3,854,578 to Sharpe, entitled Dog Dropping Disposal Kit, discloses an animal waste handling system where disposable shovel heads are provided for a non-disposable shovel handle. The disposable heads are replaced each time the head contacts solid waste. As a result, the shovel can remain sanitary. However, again, the disposable shovel heads have solid faces and will lift both litter and waste from a litter box if used to clean a litter box.

Thus, it appears that in the prior art record, non-disposable scoops for litter boxes can sift solid waste from a litter box without removing much litter. However, such non-disposable scoops become soiled and unsanitary. Disposable scoops are thin and flimsy to remain inexpensive. Thus, disposable scoops tend to rely upon the structure of a solid bag or solid liner to lift both waste material and litter from a litter box.

A need therefore exists for an inexpensive scoop structure that is slotted to pass through litter, yet remains sanitary after use without cleaning. This need is met by the present invention as described and claimed below.

SUMMARY OF THE INVENTION

The present invention is a scoop assembly for lifting animal waste that utilizes a disposable liner. The scoop assembly includes a scoop structure having a head section and a handle that extends from the head section. The head section of the scoop structure defines large openings.

A removable liner is provided for lining the head section of the scoop structure. The liner defines a plurality of slots that align over the openings in the head section of the scoop structure. As a result, when the scoop structure is used to scoop solid waste, only the liner comes into physical contact with the solid waste and becomes soiled. The soiled liner can then be disposed with the solid waste and a new liner attached to the scoop structure. The scoop structure can therefore be kept clean without the need for repeated washings.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention scoop can be used to carry most any solid animal waste, it is particularly well suited for removing solid waste from a cat litter box. Accordingly, the present invention scoop will be described being used to scoop solid waste from a cat litter box in order to set forth the best mode contemplated for the invention. However, it will be understood that the present invention scoop can be used to scoop other types of animal waste and that its application to a cat litter box is merely exemplary.

Figure 1:
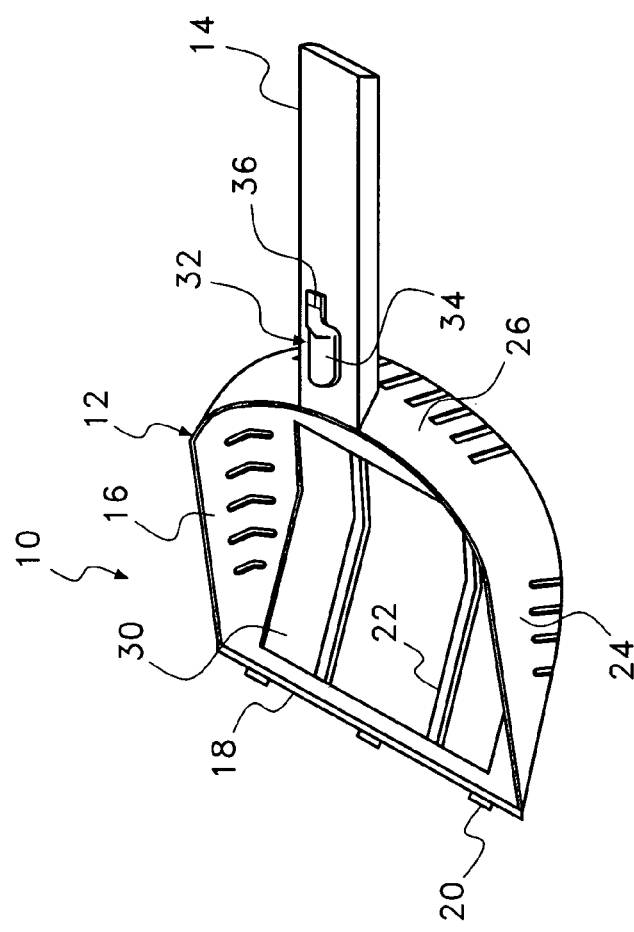
FIG. 1 is a perspective view of an exemplary view of a scoop assembly with the scoop structure shown separated from the disposable liner.
Figure 1:
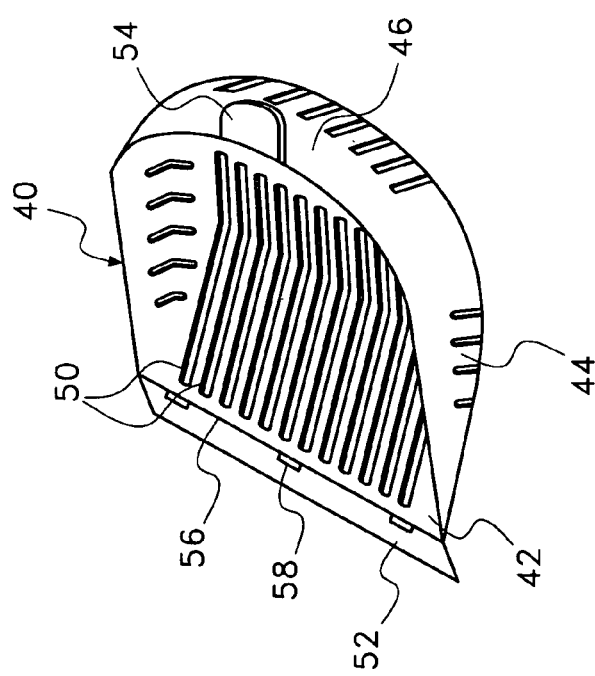

Referring to FIG. 1, a scoop assembly 10 is shown. The scoop assembly 10 includes a scoop structure 12. The scoop structure 12 can be formed from plastic or metal. The scoop structure 12 has a handle 14 and a scoop head 16 that extends forward of the handle 14. The scoop head 16 has a front edge 18. The front edge 18 leads into the scoop head 16 and is the first point of contact when the scoop structure 12 is used to scoop material. A plurality of tabs 20 extend forward from the forward edge 18. Behind the forward edge 18 is the base surface 22 of the scoop head 16. Side walls 24 extend upwardly from the sides of the base surface 22. Similarly, a rear wall extends upwardly from the rear of the base surface 22 opposite the front edge 18. The side walls 24 taper down toward the front edge 18 of the scoop head 16. The handle 14 extends from the rear wall 26 of the scoop head 16.

Openings 30, slots or similar perforations, are formed across the base surface 22 of the scoop head 16. Some of the openings 30 also travel up the side walls 24 and rear wall 26 in areas near the base surface 22. The pattern of the openings 30 is a matter of design choice and can be varied in any manner desired by a manufacturer.

A clip 32 is disposed on the handle 14 near the rear wall 26 of the scoop head 16. The clip 32 is manually operated. The clip 32 has a jaw 34 that is biased toward the handle 14. A finger lever 36 is provided that can be used to lift the jaw 34 away from the handle 14 when desired.

A disposable liner 40 is provided. The disposable liner 40 is made of a thin sheet of either paper or plastic. The disposable liner 40 has a primary feature shape that mimics the shape of the interior of the scoop head 16. Thus, the disposable liner 40 also has a base surface 42, tapered side walls 44 and a rear wall 46. Slots 50 are formed in the disposable liner 40. The pattern of the slots 50 in the disposable liner 40 is no larger than the area of the openings 30 used in the scoop head 16. Consequently, when the disposable liner 40 is placed over the scoop head 16, the slots 50 on the disposable liner 40 align over at openings 30 on the scoop head 16. Thus, the openings 30 on the scoop head 16 can be longer, wider and/or more numerous than the slots 50 in the disposable liner 40. However, the slots 50 of the disposable liner 40 are always positioned atop the openings 30 of the scoop head 16 and remain unobstructed by any part of the scoop head 16.

In addition to the features of the disposable liner 40 that correspond in shape to the scoop head 16, the disposable liner 40 also has a front flap 52 and a rear flap 54. The front flap 52 of the disposable liner 40 folds along a seam line 56. Holes 58 are formed in the seam line 56 that correspond in position to the tabs 20 that extend from the front edge 18 of the scoop head 16. The rear flap 54 extends off the top of the rear wall 46 of the disposable liner 40.

Figure 2:
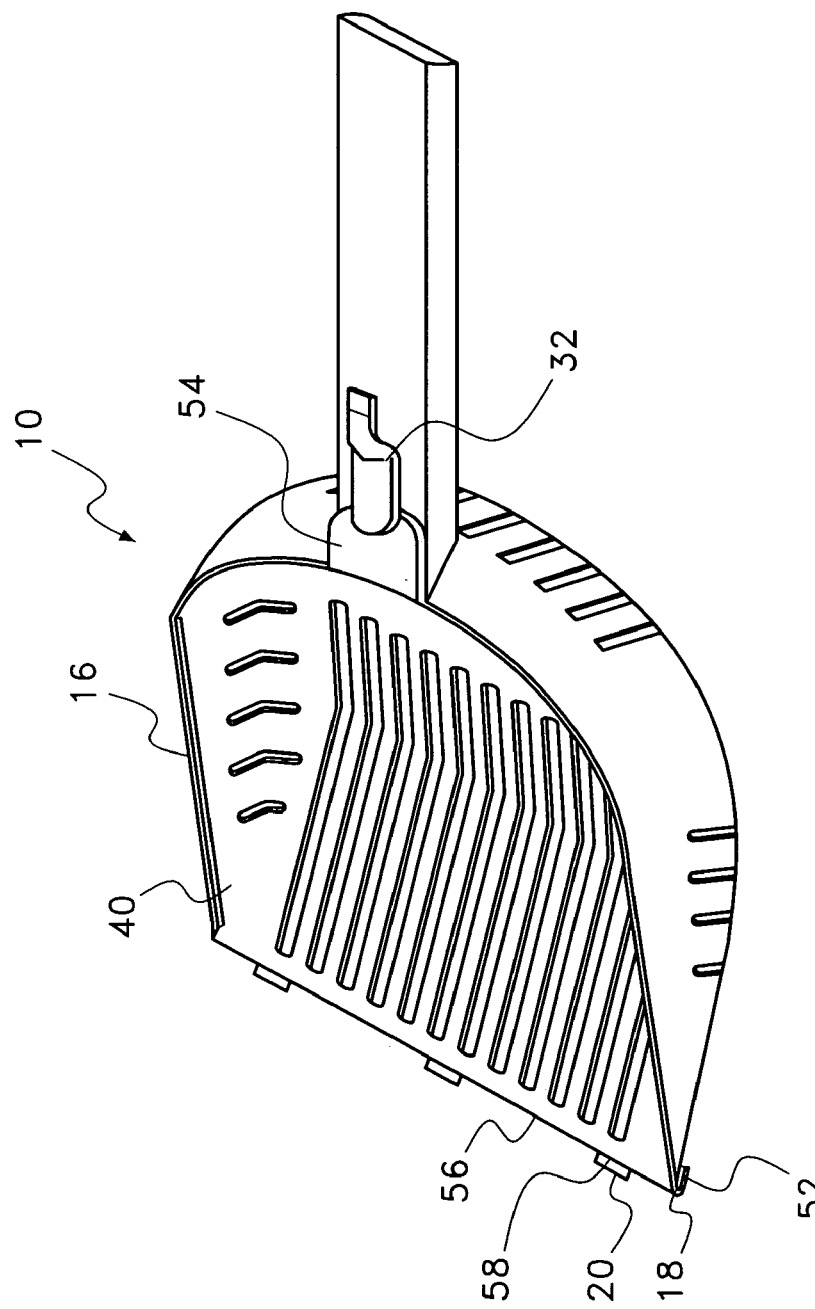
FIG. 2 is a perspective view of the embodiment of FIG. 1, wherein the liner is shown attached to the scoop structure.

Referring to FIG. 2, it can be seen that the disposable liner 40 fits into the scoop head 16 and shields the interior of the scoop head 16 from contamination. When the disposable liner 40 is set in place within the interior of the scoop head 16, the rear flap 54 is received by the clip 32 on the handle 14. The engagement of the rear flap 54 of the disposable liner 40 with the clip 32 holds the disposable liner 40 in place on the scoop structure 12. The front flap 52 of the disposable liner 40 folds under the front edge 18 of the scoop head 16. The tabs 20 that extend from the scoop head 16 extend into the holes 58 formed on the seam line 56 of the front flap 52.

The front flap 52 folds under the front edge 18 of the scoop head 16. As such, the disposable liner 40 not only protects the surfaces on the interior of the scoop head 16, the disposable liner 40 also protects underneath the scoop head 16 in the area proximate the front edge 18 of the scoop head 16.

Once the disposable liner 40 is set in place on the scoop structure 12, the scoop assembly 10 can be used in the same manner as any prior art scoop. The head 16 of the scoop assembly 10 is advanced through a litter box. The scoop assembly 10 sifts out solid waste while the litter passes through the scoop assembly 10. When the scoop assembly 10 encounters solid waste, it is the disposable liner 40 that actually contacts the solid waste. As a result, it is the disposable liner 40 that becomes soiled.

Figure 3:
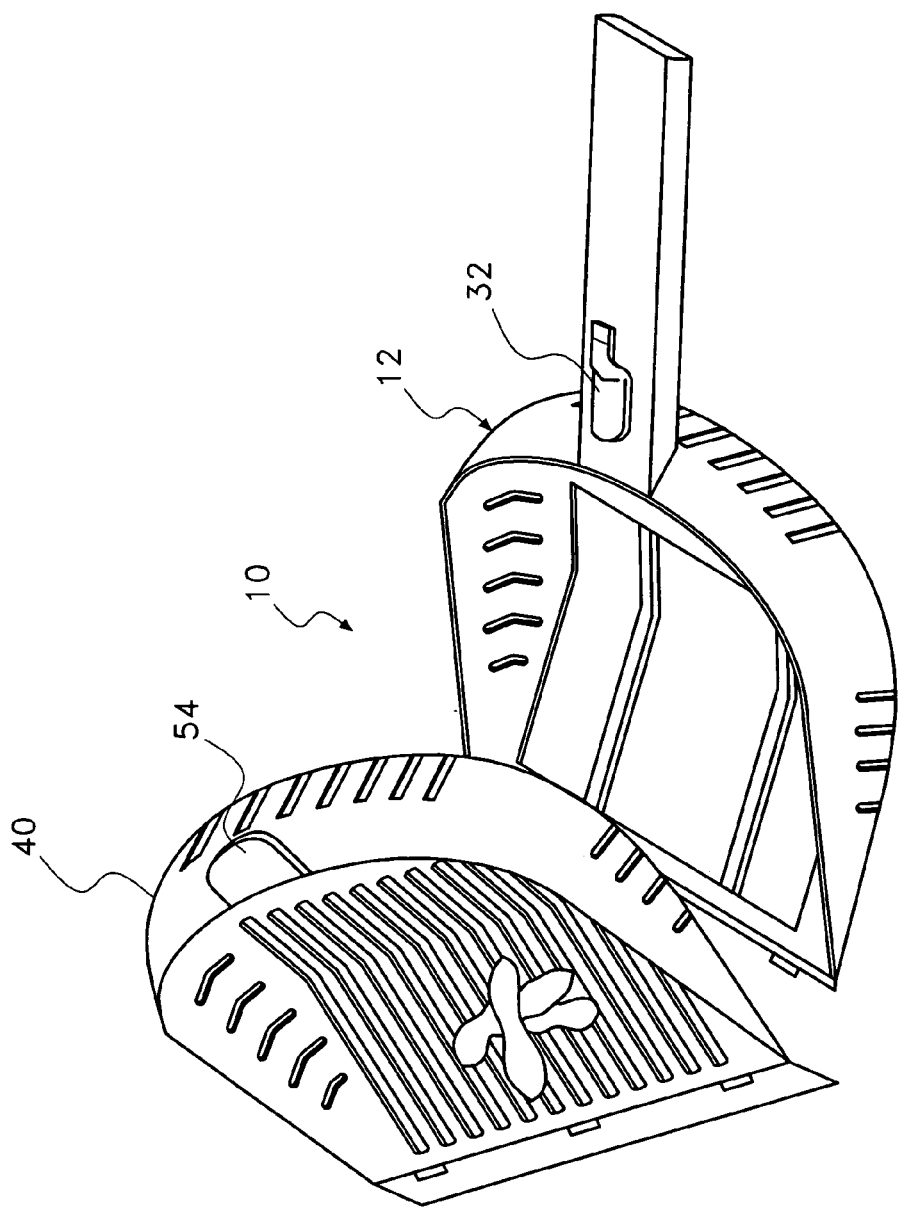
FIG. 3 is a perspective view of the embodiment of FIG. 1 where a soiled liner is being removed from the scoop structure.

Referring to FIG. 3, it can be seen that once the scoop assembly 10 has finished being used, the clip 32 can be opened and the disposable liner 40 removed. The rear flap 54 that was held by the clip 32 remains clean during use and provides a clean surface with which to grasp the disposable liner 40 and pull it free of the scoop structure 12. The underlying scoop structure 12 is protected from direct contact with solid waste by the disposable liner 40. The scoop structure 12 is therefore not soiled. To further promote the sanitary condition of the scoop structure 12, a clean disposable liner 40 can be attached to the scoop structure 12 before the scoop assembly 10 is stored. In this manner, the disposable liner 40 provides clean contact surfaces and the scoop assembly 10 is ready for use.

It will be understood that the embodiment of the present invention scoop assembly that is described and illustrated is merely exemplary and that an expert in the field can make many variations to the design. For instance, the scoop head can be varied in shape, as can the handle shape and the pattern of openings on the scoop head. Furthermore, many different clip mechanisms can be used to help attach the disposable liner to the rigid scoop. What is of importance is that the slots in the disposable liner align with the openings in the underlying scoop. The openings in the scoop can be longer and/or wider than the slots in the disposable liner, provided they do not obstruct the slots in the disposable liner. All such variations, modifications and alternate embodiments are intended to be included within the scope of the present invention as defined by the claims.

What is claimed is:

1. A scoop assembly for lifting animal waste, comprising:
 a scoop structure having a head section and a handle that extends from said head section, wherein said head section defines a plurality of openings arranged in a first pattern; and
 a removable liner for lining said head section of said scoop structure, said liner defining a plurality of slots that orient atop said plurality of openings, wherein said liner is disposable, being made from a thin section of material selected from a group consisting of paper and plastic.

2. The assembly according to claim 1, wherein said head section of said scoop structure has a front edge, and wherein said liner has a flap that folds along a seam line under said front edge.

3. The assembly according to claim 1, wherein tabs extend from said front edge of said head section.

4. The assembly according to claim 3, wherein said liner has holes along said seam line that receive said tabs on said front edge of said head section.

5. The assembly according to claim 1, further including a clip mechanism supported by said scoop structure that can be manually manipulated between an open condition and a closed condition.

6. The assembly according to claim 5, wherein said liner includes a flap that is selectively received by said clip mechanism when said liner lines said head section of said scoop structure.

7. The assembly according to claim 6, wherein said clip mechanism is disposed on said handle.

8. The assembly according to claim 1, wherein said head section of said scoop structure has a base surface, side walls and a rear wall, wherein said liner covers said base surface, said side walls and said rear wall.

9. A method comprising the steps of:
 providing a scoop having a head section and a handle, wherein said head section has a front edge and defines a plurality of openings;

providing a liner having a plurality of slots; and selectively joining said liner to said head section of said scoop by placing said liner upon said head section of said scoop and folding a portion of said liner under said front edge, wherein said plurality of slots on said liner orient atop said plurality of openings on said head section of said scoop, and wherein said liner separates said head section of said scoop from any material lifted by said head section of said scoop.

10. The method according to claim 9, wherein said front edge of said head section has tabs extending therefrom, and said liner has holes that receive said tabs when said portion of said liner is folded under said front edge.

11. The method according to claim 9, wherein said step of selectively joining said liner to said head section includes engaging holes in said liner with tabs that protrude from said head section of said scoop.

12. The method according to claim 9, wherein said step of selectively joining said liner to said head section includes attaching said liner to said head section with a clip mechanism.

13. A liner for an animal waste scoop, said liner including:

a front edge;

a rear edge;

a pattern of slots disposed between said front edge and said rear edge;

a folding seam disposed proximate said front edge, wherein said liner includes openings formed through said liner along said folding seam; and a tab protruding from said rear edge.

\* \* \* \* \*